Patented May 2, 1933

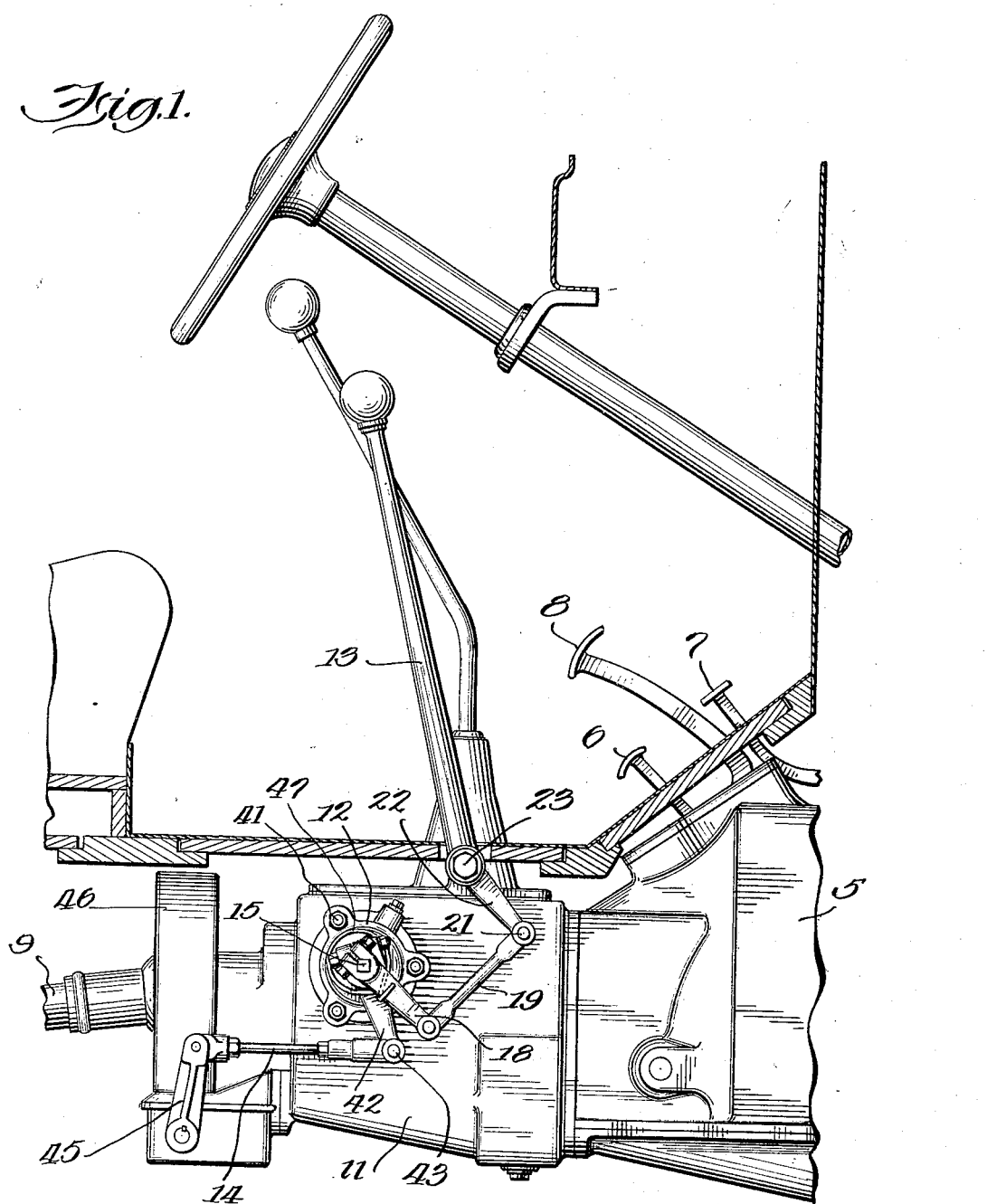

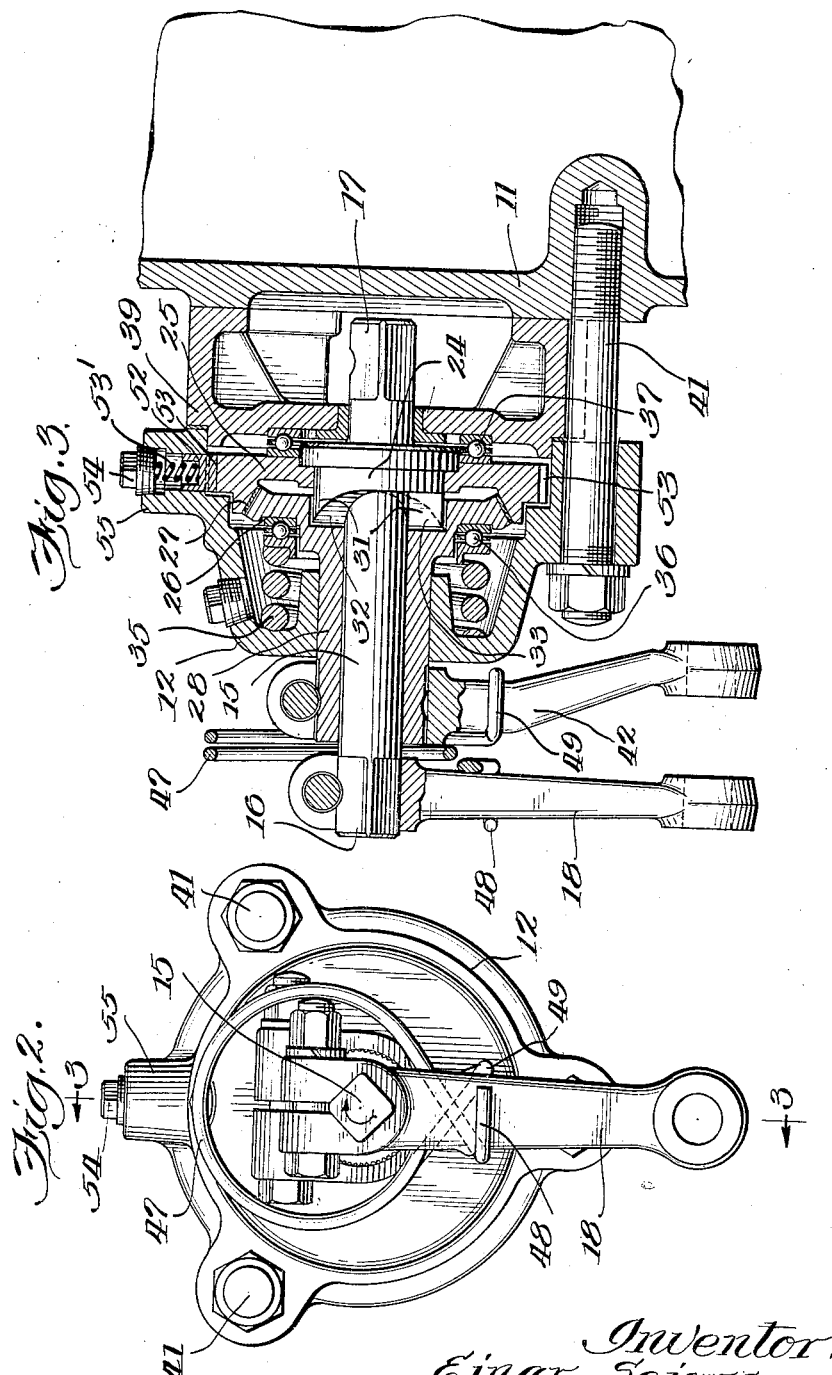

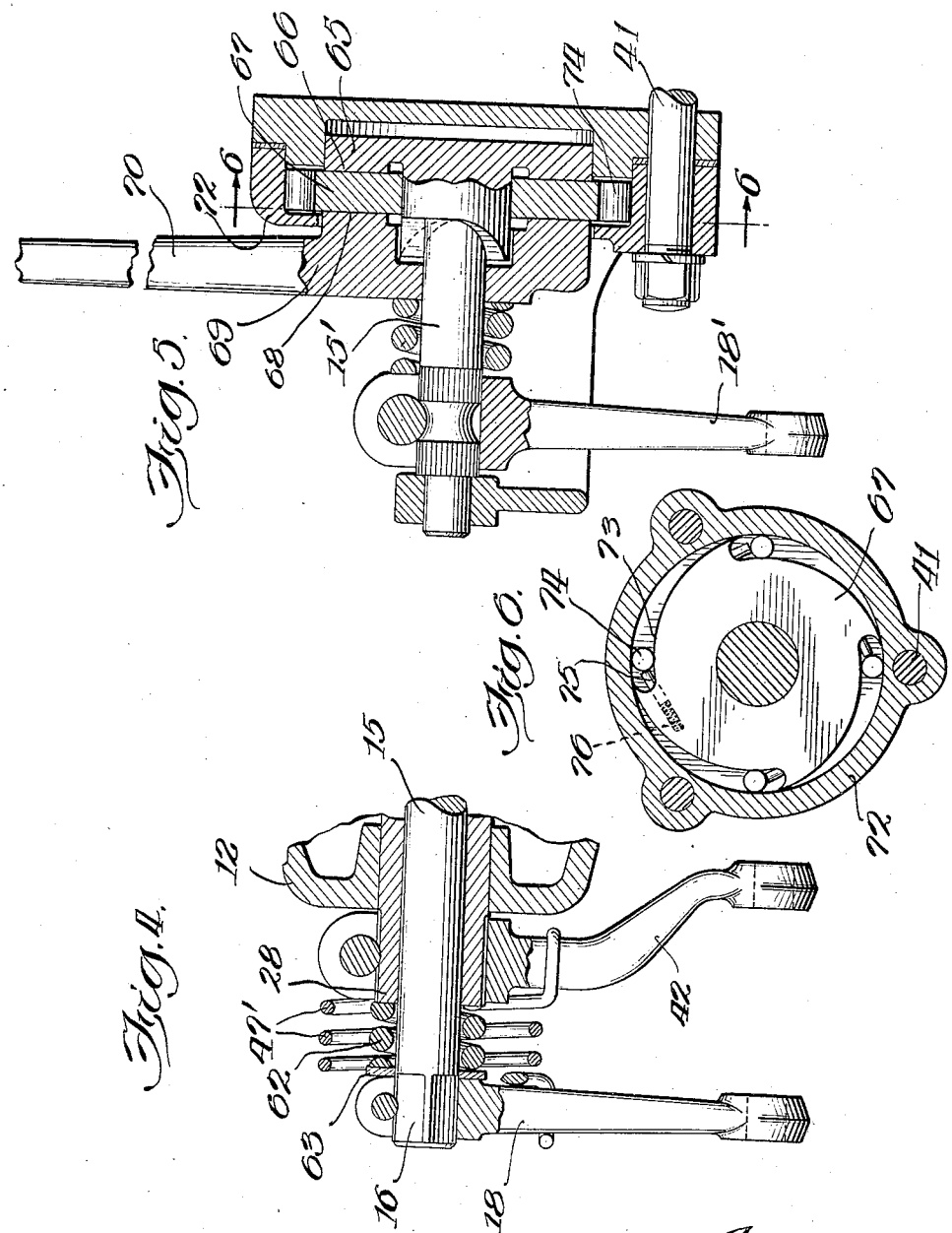

1,906,341

UNITED STATES PATENT OFFICE

EJNAR SEJERSEN, OF OAK PARK, ILLINOIS

CONTROL MECHANISM FOR BRAKES

Application filed August 6, 1931. Serial No. 555,407.

This invention relates to a control mechanism for a brake on a vehicle and more particularly to means for eliminating the usual pawl and ratchet mechanism and holding the hand brake lever in applied position.

An object of my present invention is the provision of an improved brake operating and control mechanism in which the necessity of disengaging a pawl from a ratchet in order to release the brake is eliminated.

A further object is the provision of a simplified mechanism of the type identified which is positive and reliable in operation, is durable of construction and which may be economically manufactured and readily installed.

Other objects and advantages of this invention will appear from the following description.

In the accompanying drawings:

Figure 1 is a fragmentary vertical section taken through the control compartment of a motor vehicle illustrating my invention incorporated therewith;

Figure 2 is an enlarged end elevation of the preferred form of my invention.

Figure 3 is a longitudinal vertical section taken on substantially the line 3—3 of Figure 2.

Figure 4 is a fragmentary section similar to the left end portion of Figure 3 but illustrating a modified form of my invention; and Figure 5 is a longitudinal section similar to Figure 3 but disclosing another modification of my invention.

Figure 6 is a vertical section taken on the line 6—6 of Figure 5.

The hand brake at the present generally used on motor vehicles is controlled by a brake lever having a manually releasable pawl engaging a stationary ratchet segment to hold the lever in position. When the brake is tightly applied the pawl frequently becomes very tightly wedged between the teeth of the ratchet segment so that it is difficult to release it. Also on account of the fact that the teeth on the ratchet segment are spaced some distance apart it is difficult, if not impossible, to always apply the brake with the desired force and maintain the brake lever in that position.

By the use of my improved invention it is possible to apply the brake with practically any desired force and maintain the brake lever in the position desired and the brake may be readily released by moving the brake lever in the opposite direction without first releasing a pawl from a ratchet.

Figure 1 generally illustrates a portion of a motor vehicle comprising a motor casing 5, control pedals 6, 7 and 8, a drive shaft 9, a gear casing 11 to which is secured a housing 12 having my invention incorporated therein and being operably interposed between the hand lever 13 and the brake rod 14.

In Figures 2 and 3 the preferred embodiment of my invention is illustrated more in detail. It comprises a rotatable shaft 15 having a squared portion 16 at one end and a squared portion 17 at the opposite end to either of which may be secured an arm 18 which is connected to a link 19, the forward end of which is pivotally connected at 21 to the lower end 22 of the hand lever 13 such that by moving the hand lever 13 about its pivot 23 rotary or oscillatory movement is imparted to the shaft 15. Intermediate the ends of the shaft 15 is an enlarged cylindrical portion 24 on which is rotatably mounted a clutch member 25, being a portion of a locking mechanism for a complementary clutch member 26, both of which include frustroconical interengaging faces having interposed therebetween a friction member 27. The clutch member 26 is provided with a tubular or sleeve portion 28 by which it is mounted on the shaft 15 and is adapted to reciprocate on said shaft. The cylindrical portion 24 of the shaft 15 is provided with lugs or cam elements 31 on one edge, having inclined cam faces 32 on one side and straight flat faces 33 on the other side, which cam portions interengage with identical but complementary cam portions on the clutch member 26 whereby rotation of the shaft 15 in a clockwise direction, as illustrated in Figure 2, causes the clutch member 26 to disengage from the clutch member 25 against the force of the spring 35 which is interposed between the casing 12 and the thrust bearings 36 engaging the rear face of the clutch member 26.

Similar thrust bearings 37 are interposed between the clutch member 25 and the housing 39 for restraining movement of the clutch member 25 toward the right as shown in Figure 3. The casing 12 and the housing 39, together with the mechanism mounted thereon, are securely held in position on the gear casing 11 by suitable bolts 41. Upon the outer end of the tubular portion 28 of the clutch member 26 is secured an arm 42, the lower end of which is pivoted at 43 to the brake rod 14. The brake rod 14 is in turn pivoted to the lever 45 for actuating a brake contained within the brake housing 46. In order to insure the movement of the arms 18 and 42 to fully released position when the lever 13 is moved forwardly I have provided a coil spring 47, the ends 48 and 49 of which engage the arms 18 and 42 respectively. This spring by its actuation of the arms 18 and 42 causes relative movement of the clutch member 26 and the shaft 15 in a direction to facilitate the action of the spring 35 in forcibly pressing the clutch member 26 into firm engagement with the cooperating clutch face on the clutch member 25 which serves to lock the clutch member 26 from rotation in one direction by means of a pawl 52 engaging the teeth 53 on the periphery of the clutch member 25. The pawl 52 is pressed downwardly by a spring 53' held in place by a cap 54 having threaded engagement with the boss 55.

In Figure 4 I have illustrated a modified form of my invention in which the spring 35 is eliminated and instead thereof I employ a spring 62 interposed between a washer 63 engaging the inner side of the arm 18, and the outer end of the tubular portion 28 of the clutch member 26. In this modification I also employ a spring 47' which engages the arms 18 and 42 in the same manner as above described with reference to spring 47 except that this spring may be slightly more rigid than the spring 47 for aiding the spring 62 which is not as powerful as the spring 35 in the preferred form of my invention.

In Figure 5 I have illustrated another modification of my invention comprising a shaft 15' having an arm 18' thereon for rotating the same. In this form of my invention the shaft 15' is provided with an enlarged cylindrical portion 65 having a friction face 66 engaging an intermediate friction member 67 interposed between the face 66 and a similar face 68 on the clutch member 69 to which is fixed the brake operating arm 70. The member 67 is disposed within a cover element 72. The member 67 is provided with recessed portions 73 having therein rollers 74 which are normally held in their forward position by pins 75, which pins are in turn urged forwardly by springs 76. This mechanism permits rotation of the member 67 in one direction relative to the cover 72 but prevents rotation in the opposite direction and effects the same results as the mechanism illustrated in the preferred form of my invention.

From the foregoing description it will be understood that upon drawing the hand lever toward the operator the shaft 15 of the preferred form and 15' of the modification shown in Figure 5 will be rotated in a direction such that the cam portions thereon will interlock with the cam portions on the clutch members 26 and 69 respectively and rotate the same together with their respective locking means whereby the brake is actuated and held in position. Upon movement of the lever 13 forwardly from the operator the cam portions 31 are caused to bring into action their cam faces 32 by which they force a disengagement of the clutch member from the locking mechanism, thereby allowing the brakes to be released.

It will be understood that this invention is susceptible of certain modifications without departing from the principle thereof and I desire to avail myself of such modifications as come within the scope of the appended claims.

I claim as my invention:

1. In a vehicle in combination, brake applying means, a brake lever for actuating said brake applying means, and mechanism operably interposed between said lever and said brake applying means comprising; an oscillatory shaft operably connected to said lever, a rotatable clutch member, means for preventing rotation of said clutch member in one direction while permitting rotation in the opposite direction, a second clutch member operably connected to said brake applying means, yielding means normally urging said clutch members into firm engagement, means on said shaft fixed for rotation therewith and adapted upon rotation of said shaft in one direction to engage and drive said second clutch member and upon rotation in the opposite direction to disengage said clutch members.

2. In a vehicle in combination, brake applying means, a brake lever for actuating said brake applying means, and mechanism operably interposed between said lever and said brake applying means comprising; an oscillatory shaft operably connected to said lever, a rotatable clutch member, means for preventing rotation of said clutch member in one direction while permitting rotation in the opposite direction, a second clutch member operably connected to said brake applying means, yielding means normally urging said clutch members into firm engagement, opposed cam portions on said shaft and on said second clutch member respectively adapted to interlock and drive said second clutch member upon rotation of said shaft in one direction and adapted to cooperate to disengage said clutch members upon rotation of said shaft in the opposite direction.

3. In a vehicle in combination, brake applying means, a brake lever for actuating said brake applying means, and mechanism operably interposed between said lever and said brake applying means comprising; an oscillatory shaft operably connected to said lever, a rotatable clutch member, means for preventing rotation of said clutch member in one direction while permitting rotation in the opposite direction, a second clutch member operably connected to said brake applying means, yielding means normally urging said clutch members into firm engagement, said clutch members including complementary interengaging portions having frusto-conical friction faces, means on said shaft fixed for rotation therewith and adapted upon rotation of said shaft in one direction to engage and drive said second clutch member and upon rotation in the opposite direction to disengage said clutch members.

4. In a vehicle in combination, brake applying means, a brake lever for actuating said brake applying means, and mechanism operably interposed between said lever and said brake applying means comprising; an oscillatory shaft operably connected to said lever, a rotatable clutch member, means for preventing rotation of said clutch member in one direction while permitting rotation in the opposite direction, a second clutch member operably connected to said brake applying means, yielding means normally urging said clutch members into firm engagement, said clutch members including complementary interengaging portions having frusto-conical friction faces, a friction lining interposed between said faces, opposed cam portions on said shaft and on said second clutch member respectively adapted to interlock and drive said second clutch member upon rotation of said shaft in one direction and adapted to cooperate to disengage said clutch members upon rotation of said shaft in the opposite direction.

5. In a vehicle combination, brake applying means, a brake lever for actuating said brake applying means, and mechanism operably interposed between said lever and said brake applying means comprising; an oscillatory shaft operably connected to said lever, a rotatable clutch member, means for preventing rotation of said clutch member in one direction while permitting rotation in the opposite direction, a second clutch member operably connected to said brake applying means, yielding means normally urging said clutch members into firm engagement, thrust bearings for restricted axial movement of the first said clutch member, thrust bearings interposed between said second clutch member and said yielding means, means on said shaft fixed for rotation therewith and adapted upon rotation of said shaft in one direction to engage and drive said second clutch member and upon rotation in the opposite direction to disengage said clutch member.

6. In a vehicle in combination, brake applying means, a brake lever for actuating said brake applying means, and mechanism operably interposed between said lever and said brake applying means comprising; an oscillatory shaft operably connected to said lever, a rotatable clutch member, means for preventing rotation of said clutch member in one direction while permitting rotation in the opposite direction, a second clutch member operably connected to said brake applying means, yielding means normally urging said clutch members into firm engagement, thrust bearings for restricting axial movement of the first said clutch member, thrust bearings interposed between said second clutch member and said yielding means, opposed cam portions on said shaft and on said second clutch members respectively, adapted to interlock and drive said second clutch member upon rotation of said shaft in one direction and adapted to cooperate to disengage said clutch members upon rotation of said shaft in the opposite direction.

7. In a vehicle in combination, brake applying means, a brake lever for actuating said brake applying means, and mechanism operably interposed between said lever and said brake applying means comprising; an oscillatory shaft, an arm on said shaft operably connected to said lever, a clutch member, a second arm on said clutch member connected to said brake applying means, a torsion spring between said arms, locking means for said clutch member for normally restraining movement of said clutch member in one direction, cooperating portions on said clutch member and on said shaft respectively adapted upon rotation of said shaft in one direction to interlock and drive said clutch member, and upon rotation in the opposite direction to release said clutch member from said locking means.

8. In a vehicle in combination, brake applying means, a brake lever for actuating said brake applying means, and mechanism operably interposed between said lever and said brake applying means comprising; a rotatable shaft, an arm on said shaft operably connected to said lever, a clutch member, a second arm on said clutch member connected to said brake applying means, locking means for said clutch member for normally restraining movement of said clutch member in one direction, cooperating portions on said clutch member and on said shaft respectively adapted upon rotation of said shaft in one direction to interlock and drive said clutch member, and upon rotation in the opposite direction to release said clutch member from said locking means, spring means for yieldingly urging said clutch member into engagement with said locking means, and a spring engaging said arms for urging them to a position to facilitate the action of said spring means.

9. In a vehicle in combination, brake applying means, a brake lever for actuating said brake applying means, and mechanism operably interposed between said lever and said brake applying means comprising; a rotatable shaft, an arm on said shaft operably connected to said lever, a clutch member, a second arm on said clutch member connected to said brake applying means, a spring operatively connected between said arms to move them in opposite directions, locking means for said clutch member for normally restraining movement of said clutch member in one direction, cooperating portions on said clutch member and on said shaft respectively adapted upon rotation of said shaft in one direction to interlock and drive said clutch member, and upon rotation in the opposite direction to release said clutch member from said locking means, said locking means comprising a second rotatable clutch member engageable with the first said clutch member and means for restraining rotary movement of said second clutch member in one direction and permitting movement thereof in the opposite direction.

10. In a vehicle in combination, brake applying means, a brake lever for actuating said brake applying means, and mechanism operably interposed between said lever and said brake applying means comprising; a rotatable shaft, an arm on said shaft operably connected to said lever, a clutch member, a second arm on said clutch member connected to said brake applying means, locking means for said clutch member for normally restraining movement of said clutch member in one direction, cooperating portions on said clutch member and on said shaft respectively adapted upon rotation of said shaft in one direction to interlock and drive said clutch member, and upon rotation in the opposite direction to release said clutch member from said locking means said locking means comprising a second rotatable clutch member engageable with the first said clutch member and means for restraining rotary movement of said second clutch member in one direction and permitting movement thereof in the opposite direction, spring means for yieldingly urging said clutch member into engagement with said locking means, and a spring interposed between and engaging said arms for urging them to a position to facilitate the action of said spring means.

In witness whereof, I hereunto subscribe my name this 1st day of August, 1931.

EJNAR SEJERSEN.